United States Patent
Takahashi et al.

(10) Patent No.: US 11,697,694 B2
(45) Date of Patent: Jul. 11, 2023

(54) METHOD OF MANUFACTURING POLYMERIZABLE COMPOSITION, POLYMERIZABLE COMPOSITION, AND CURED PRODUCT

(71) Applicant: GC Corporation, Shizuoka (JP)

(72) Inventors: Makoto Takahashi, Tokyo (JP); Naofumi Niizeki, Tokyo (JP); Tomoki Kohno, Tokyo (JP); Yuri Fukuyo, Tokyo (JP); Toshiki Mori, Tokyo (JP); Yuki Kasai, Tokyo (JP); Naoya Funayama, Tokyo (JP)

(73) Assignee: GC Corporation, Shizuoka (JP)

( * ) Notice: Subject to any disclaimer, the term of this patent is extended or adjusted under 35 U.S.C. 154(b) by 33 days.

(21) Appl. No.: 17/328,142

(22) Filed: May 24, 2021

(65) Prior Publication Data

US 2021/0371549 A1     Dec. 2, 2021

(30) Foreign Application Priority Data

May 29, 2020   (JP) .................................. 2020-094762
Mar. 22, 2021   (JP) .................................. 2021-047938

(51) Int. Cl.
*C08F 2/08* (2006.01)
*C08F 2/10* (2006.01)
*C08F 290/06* (2006.01)

(52) U.S. Cl.
CPC .................. *C08F 2/08* (2013.01); *C08F 2/10* (2013.01); *C08F 290/061* (2013.01)

(58) Field of Classification Search
CPC .......... C08F 2/08; C08F 2/10; C08F 290/061; C08F 2/46; C08F 220/34; C08F 222/1063
See application file for complete search history.

(56) References Cited

U.S. PATENT DOCUMENTS

| 5,408,022 A | 4/1995 | Imazato et al. |
| 2003/0064102 A1* | 4/2003 | Nakatsuka ............. A61P 31/02 424/486 |

(Continued)

FOREIGN PATENT DOCUMENTS

| CN | 106749878 | 5/2017 |
| JP | H06-009725 | 1/1994 |
| JP | 2002-047118 | 2/2002 |

OTHER PUBLICATIONS

Ramos J et al: "The role of cationic monomers in emulsion polymerization", European Polymer Journal, Pergamon Press Ltd Oxford, GB, vol. 46, No. 5, Jan. 22, 2010 (Jan. 22, 2010), pp. 1106-1110, XP027011626, ISSN: 0014-3057 [retrieved on Apr. 15, 2010] * experimental section; table 1 *.

*Primary Examiner* — Robert S Jones, Jr.
*Assistant Examiner* — Jiangtian Xu
(74) *Attorney, Agent, or Firm* — IPUSA, PLLC

(57) ABSTRACT

A method of manufacturing a polymerizable composition is capable of imparting antibacterial properties and the like to a cured product of polymerizable composition without deteriorating an appearance of the cured product of the polymerizable composition. The method of manufacturing a polymerizable monomer wherein a solution, that a second polymerizable monomer is dissolved in a first solvent, is dispersed in a first polymerizable monomer, includes mixing the first polymerizable monomer, the second polymerizable monomer, and the first solvent. The first polymerizable monomer is a liquid, and the second polymerizable monomer is a solid.

5 Claims, 3 Drawing Sheets

(56) References Cited

U.S. PATENT DOCUMENTS

2006/0120021 A1 6/2006 Banno et al.
2016/0030894 A1 2/2016 Yin

* cited by examiner

METHOD OF MANUFACTURING POLYMERIZABLE COMPOSITION, POLYMERIZABLE COMPOSITION, AND CURED PRODUCT

CROSS-REFERENCE TO RELATED APPLICATIONS

This application is based upon and claims priority to Japanese Patent Application No. 2020-094762, filed May 29, 2020 and Japanese Patent Application No. 2021-047938, filed Mar. 22, 2021, the entire contents of which are incorporated herein by reference.

BACKGROUND OF THE INVENTION

1. Field of the Invention

The disclosures herein relate to a method of manufacturing a polymerizable composition, a polymerizable composition, and a cured product.

2. Description of the Related Art

Conventionally, there is a technique for imparting functions such as antibacterial properties and the like to a cured product prepared by curing a polymerizable composition. In addition, due to the recent epidemic of new viral infectious diseases, the demand for products having antiviral functions and the like is increasing.

For example, Patent Document 1 discloses a polymerizable composition including an ethylenically unsaturated monomer, at least one monomer selected from a monofunctional to a trifunctional compound having a specific antibacterial property, and a polymerization initiator.

However, there are problems with the appearance of the cured product of the conventional polymerizable composition when the conventional polymerizable composition has functions of antibacterial properties and the like.

RELATED-ART DOCUMENTS

Patent Document 1: Japanese Patent Application Laid-Open No. H6-9725

SUMMARY OF THE INVENTION

One aspect of the invention is to provide a method of manufacturing a polymerizable composition capable of imparting functions such as antibacterial properties and the like to a cured product of a polymerizable composition without deteriorating an appearance of the curable product of the polymerizable composition.

One aspect of the invention is a method of manufacturing a polymerizable monomer wherein a solution, that a second polymerizable monomer is dissolved in a first solvent, is dispersed in a first polymerizable monomer, the method including a step of mixing the first polymerizable monomer, the second polymerizable monomer, and the first solvent, wherein the first polymerizable monomer is a liquid, and the second polymerizable monomer is a solid.

According to an embodiment of the present invention, the present invention is capable of imparting functions such as antibacterial properties and the like to a cured product of a polymerizable composition without deteriorating an appearance of the curable product of the polymerizable composition.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1:
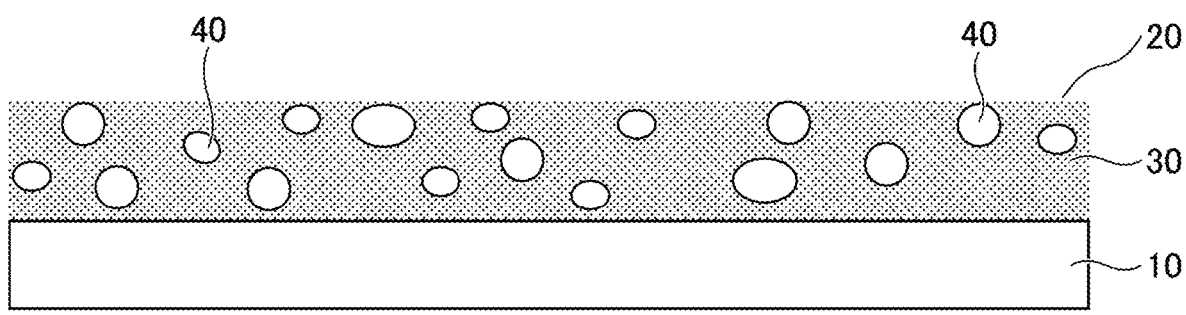
FIG. 1 is a schematic view illustrating a cross-section of a polymerizable composition according to an embodiment.

Next, an embodiment for carrying out the present invention will be described.

<Method of Manufacturing a Polymerizable Composition>

A method of manufacturing a polymerizable composition of the present embodiment relates to a method of manufacturing a polymerizable monomer, wherein a solution, that a second polymerizable monomer is dissolved in a first solvent, is dispersed in a first polymerizable monomer.

A method of manufacturing a polymerizable composition according to the present embodiment includes mixing a first polymerizable monomer, a second polymerizable monomer, and a first solvent (hereinafter referred to as a mixing step).

In a method of manufacturing a polymerizable composition of the present embodiment, the first polymerizable monomer is a liquid, and the second polymerizable monomer is a solid. For example, the first polymerizable monomer is a liquid at room temperature and normal pressure, and the second polymerizable monomer is solid at room temperature and normal pressure.

When the first polymerizable monomer and the second polymerizable monomer are mixed without using the first solvent, it is difficult to control the particle size of the second polymerizable monomer. Therefore, it is difficult to uniformly distribute the second polymerizable monomer in the first polymerizable monomer. As a result, the appearance and strength of the cured product of the polymerizable composition are deteriorated. In addition, when the first polymerizable monomer and the second polymerizable monomer are mixed without using the first solvent, a viscosity of the polymerizable composition is markedly increased and the workability of the polymerizable composition is reduced, because the second polymerizable monomer functions as a filler having a polarity different from that of the first polymerizable monomer.

In contrast, when the first polymerizable monomer, the second polymerizable monomer, and the first solvent are mixed, it is capable of uniformly distributing the second polymerizable monomer in the polymerizable composition. As a result, the appearance and strength of the cured product of the polymerizable composition can be improved while imparting functions or performances derived from the second polymerizable monomer to the cured product of the polymerizable composition.

For example, when the second polymerizable monomer includes functional groups that exhibit antibacterial properties (hereinafter referred to as antibacterial group), it is capable of imparting the antibacterial properties to the cured product of the polymerizable composition. In addition, when the second polymerizable monomer includes functional groups that exhibit antiviral properties (hereinafter, referred to as an antiviral group), it is capable of imparting the antiviral properties to the cured product of the polymerizable composition.

The mass ratio of the first solvent with respect to the second polymerizable monomer is preferably from 0.01 to 5, and more preferably from 0.1 to 2. When the mass ratio of the first solvent with respect to the second polymerizable monomer is 0.01 or more, the stability of the cured polymerizable composition is improved when the second polymerizable monomer is dissolved in the first solvent. When the mass ratio of the first solvent with respect to the second polymerizable monomer is 5 or less, the mechanical strength of the cured polymerizable composition is improved.

The mass ratio of the first polymerizable monomer with respect to the total amount of the second polymerizable monomer and the first solvent is preferably from 0.1 to 100, and further preferably from 0.5 to 50. If the mass ratio of the first polymerizable monomer with respect to the total amount of the second polymerizable monomer and the first solvent is 0.1 or more, the mechanical strength of the cured polymerizable composition is improved. If the mass ratio of the first polymerizable monomer with respect to the total amount of the second polymerizable monomer and the first solvent is 100 or less, the performance of the cured polymerizable composition derived from the second polymerizable monomer is improved.

In the present embodiment, when the first polymerizable monomer, the second polymerizable monomer, and the first solvent are mixed, a surfactant may or may not be added.

The surfactant is not particularly limited as long as the surfactant is capable of improving the dispersibility of the solution. Examples of the surfactants include sodium lauryl sulfate, glycerin fatty acid ester, and the like. These surfactants may be used alone, and two or more surfactants may be used in combination.

In the mixing step of the present embodiment, it is preferable to knead the mixture by adding other components such as a photopolymerization initiator, a tertiary amine, a polymerization inhibitor, a filler, and the like.

Other components may be added before the first polymerizable monomer, the second polymerizable monomer and/or the first solvent are added. Alternatively, other components may be added after the first polymerizable monomer, the second polymerizable monomer, and the first solvent are mixed.

The mixing step may include dissolving the second polymerizable monomer in the first solvent to prepare a solution, and mixing then the solution with the first polymerizable monomer.

When the first polymerizable monomer is mixed with a solution in which the second polymerizable monomer is dissolved in the first solvent, the second polymerizable monomer can be uniformly distributed in the polymerizable composition. As a result, the appearance and strength of the cured product of the polymerizable composition can be improved while imparting the functions or performances derived from the second polymerizable monomer to the cured product of the polymerizable composition.

For example, when the second polymerizable monomer has the antibacterial group, it is capable of imparting the antibacterial properties to the cured product of the polymerizable composition. Further, when the second polymerizable monomer includes the antiviral group, it is capable of imparting the antiviral properties to the cured product of the polymerizable composition.

When the first solvent is water, moisture in the atmosphere may be absorbed into the second polymerizable monomer to dissolve the second polymerizable monomer in water.

Examples of methods of mixing the solution in which the second polymerizable composition is dissolved in the first solvent and the first polymerizable monomer include, for example, a method of mixing and kneading the solution and the first polymerizable monomer with a mortar, a method of mixing the solution and the first polymerizable monomer with a magnetic stirrer, a method of mixing the solution and the first polymerizable monomer with a stirrer having a stirring blade, and the like.

In the present embodiment, when the solution and the first polymerizable monomer are mixed, a surfactant may or may not be added.

The surfactant is not particularly limited as long as the surfactant is capable of improving the dispersibility of the solution. Examples of the surfactants include sodium lauryl sulfate, glycerin fatty acid ester, and the like. These surfactants may be used alone, and two or more surfactants may be used in combination.

In the present embodiment, when the solution in which the second polymerizable monomer is dissolved in the first solvent and the first polymerizable monomer are mixed, it is preferable to knead the mixture by adding other components such as a photopolymerization initiator, a tertiary amine, a polymerization inhibitor, a filler, and the like.

Before mixing the solution and/or the first polymerizable monomer, other components may be added. Alternatively, other components may be added to the mixture after mixing the solution and the first polymerizable monomer.

The mixing step may include a step of dissolving at least a portion of the first polymerizable monomer and the second polymerizable monomer in a second solvent to prepare a solution, evaporating the second solvent from the solution to prepare a dispersion liquid in which the second polymerizable monomer is dispersed in at least a portion of the first polymerizable monomer, and mixing the dispersion liquid with the first solvent.

When the first solvent is mixed with a dispersion liquid in which the second polymerizable monomer is dispersed in the first polymerizable monomer, the second polymerizable monomer can be uniformly distributed in the polymerizable composition. As a result, the appearance and strength of the cured product of the polymerizable composition can be improved while imparting functions and performances derived from the second polymerizable monomer to the cured product of the polymerizable composition.

For example, when the second polymerizable monomer has an antibacterial group, it is capable of imparting antibacterial properties to the cured product of the polymerizable composition. In addition, when the second polymerizable monomer has an antiviral group, it is capable of imparting antiviral properties to the cured product of the polymerizable composition.

When a portion of the first polymerizable monomer is used to prepare the solution, the dispersion liquid and the rest of the first polymerizable monomer are mixed after preparing the dispersion liquid. At this time, the timing of mixing the dispersion liquid and the rest of the first polymerizable monomer is not particularly Limited. However, when mixing the dispersion liquid and the first solvent, it is preferable to mix the rest of the first polymerizable monomer.

The mass ratio of the second polymerizable monomer with respect to at least a portion of the first polymerizable monomer in preparing the solution is preferably in the range of 0.01 to 100 and more preferably in the range of 0.05 to 50. If the mass ratio of the first polymerizable monomer and the second polymerizable monomer is in the range of 0.01 to 100, the dispersion liquid prepared by evaporating the second solvent from the solution exhibits improved the dispersibility.

The content of the second solvent in the solution is not particularly limited. For example, the content of the second solvent in the solution is preferably 10 to 99% by mass. If the content of the second solvent in the solution is 10% by mass or more, the dissolution stability of the polymerizable monomer is improved. If the content of the second solvent in the solution is 99% by mass or less, the evaporation of the second solvent from the solution is easily performed.

Examples of the methods of mixing the dispersion liquid and the first solvent include a method of stirring the dispersion liquid and the first solvent, a method of mixing the dispersion liquid and the first solvent using a magnetic stirrer, and a method of mixing the dispersion liquid and the first solvent using a stirrer having a stirring blade.

In the present embodiment, when the dispersion liquid and the first solvent are added, a surfactant may be added or a surfactant may not be added.

The surfactant is not particularly limited as long as the surfactant is capable of improving the dispersibility of the solution. Examples of the surfactants include sodium lauryl sulfate, glycerin fatty acid ester, and the like. These surfactants may be used alone, and two or more surfactants may be used in combination.

In the present embodiment, the dispersion liquid and the first solvent are mixed, and other components such as a photopolymerization initiator, a tertiary amine, a polymerization inhibitor, a filler, and the like are then preferably added to the mixture and kneaded.

Before mixing the dispersion liquid and/or the first solvent, other components may be added.

Alternatively, when the dispersion liquid and the first solvent are mixed, other components may also be added.

dimethacrylate, urethane dimethacrylate, glycerin dimethacrylate, triethylene glycol dimethacrylate, and the like. These first polymerizable monomer may be used alone, and two or more monomers of the first polymerizable monomers may be used in combination.

<Second Polymerizable Monomer>

The second polymerizable monomer is a solid at room temperature and normal pressure. The second polymerizable monomer is soluble in the first solvent and insoluble in the first polymerizable monomer.

The second polymerizable monomer is preferably (meth) acrylate and further preferably is a monofunctional (meth) acrylate having one (meth)acryloyloxy group.

The second polymerizable monomer preferably has a functional group that exhibits at least one of antibacterial properties and antiviral properties. The functional group exhibiting at least one of antibacterial properties and antiviral properties indicates that when one functional group exhibits both antibacterial properties and antiviral properties, one functional group has either an antibacterial group exhibiting antibacterial properties or an antiviral group exhibiting antiviral properties. Further, the functional group exhibiting both antibacterial properties and antiviral properties includes a case where it has a functional group exhibiting antibacterial properties and a functional group exhibiting antiviral properties, respectively.

The functional groups that exhibit at least one of antibacterial properties and antiviral properties are not particularly limited. Examples of the functional groups include quaternary ammonium bases and the like. The quaternary ammonium base can function as an antibacterial group as well as an antiviral group.

Examples of the second polymerizable monomers containing a functional group that exhibits at least one of antibacterial properties and antiviral properties include monofunctional polymerizable monomers such as, 2-(methacryloyloxy) ethyltrimethylammonium chloride, (3-acrylamidepropyl) trimethylammonium chloride, (2-(acryloyloxy) ethyl) trimethylammonium chloride, N-(2-acrylloyloxyethyl)-N-benzyl-N, N-dimethylammonium chloride, dimethylaminopropylacrylamide methyl chloride quaternary salt, dimethylaminoethylacrylate methyl chloride quaternary salt, dimethylaminoethyl acrylate benzyl chloride quaternary salt; a polyfunctional polymerizable monomer represented by the following the chemical formula; and the like. These second polymerizable monomers having a functional group exhibiting at least one of antibacterial and antiviral properties may be used individually or in combination of two or more second polymerizable monomers.

[Chemical Formula 1]

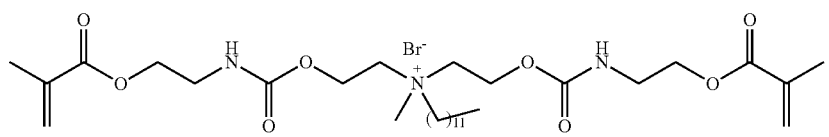

<First Polymerizable Monomer>

The first polymerizable monomer is a liquid at room temperature and normal pressure. The first polymerizable monomer is insoluble in the first solvent.

The first polymerizable monomer is preferably (meth) acrylate and further preferably is a multifunctional (meth) acrylate having two or more (meth)acryloyloxy groups.

Examples of the first polymerizable monomers include ethoxylated bisphenol A dimethacrylate, neopentylglycol Examples of the second polymerizable monomers containing neither an antibacterial group nor an antiviral group include phenoxyethylene glycol methacrylate, dimethylaminoethyl methacrylate, and the like.

The second polymerizable monomers containing neither an antibacterial group nor an antiviral group may be used individually or in combination with two or more second polymerizable monomers.

<First Solvent>

Examples of the first solvents include water, glycerin, propylene glycol, ethylene glycol, polyethylene glycol having an average molecular weight of 1200 or less, butylene glycol, and the like. These first solvent may be used individually or in combination with two or more first solvents.

<Second Solvent>

Examples of the second solvents include organic solvents such as ethanol, acetone, hexane, and the like. These second solvents may be used individually or in combination of two or more solvents.

<Photopolymerization Initiator>

Examples of the photopolymerization initiators include camphorquinone, phenylbis (2,4,6-trimethylbenzoyl) phosphine oxide, 2,4,6-trimethylbenzoyl diphenylphosphine oxide, benzyl ketal, diacetyl ketal, benzyl dimethyl ketal, benzyl diethyl ketal, benzylbis (2-methoxyethyl) ketal, 4,4'-dimethyl (benzyldimethyl ketal), anthraquinone, 1-chloroanthraquinone, 2-chloroanthraquinone, 1,2-benzanthraquinone, 1-hydroxyanthraquinone, 1-methylanthraquinone, 2-ethylanthraquinone, 1-bromoanthraquinone, thioxanthone, 2-isopropylthioxanthone, 2-nitrothioxanthone, 2-methylthioxanthone 2,4-dimethylthioxanthone, 2,4-diethylthioxanthone, 2,4-diisopropylthioxanthone, 2-chloro-7-trifluoromethylthioxanthone, thioxanthone-10,10-dioxide, thioxanthone-10-oxide, benzoin methyl ether, benzoin ethyl ether, benzoin isopropyl ether, benzoin isobutyl ether, benzophenone, bis(4-dimethylaminophenyl)ketone, 4,4'-bis(diethylamino)benzophenone, and the like. These photopolymerization initiators may be used individually or in combination of two or more photopolymerization initiators.

<Tertiary Amine>

The tertiary amine may be either a tertiary aliphatic amine or a tertiary aromatic amine, but is preferably a tertiary aromatic amine, and more particularly alkyl p-dialkylaminobenzoate.

The tertiary aliphatic amines include, for example, N,N-dimethylaminoethylmethacrylate, triethanolamine, and the like.

Examples of alkyl p-dialkylaminobenzoate include methyl p-dimethylaminobenzoate, ethyl p-dimethylaminobenzoate, propyl p-dimethylaminobenzoate, amyl p-dimethylaminobenzoate, isoamyl p-dimethylaminobenzoate, ethyl p-diethylaminobenzoate, propyl p-diethylaminobenzoate, and the like.

Examples of tertiary aromatic amines other than alkyl p-dialkylaminobenzoate include 7-dimethylamino-4-methylcoumarin, N,N-dimethylaniline, N,N-dibenzylaniline, N,N-dimethyl-p-toluidine, N,N-diethyl-p-toluidine, N,N-bis (2-hydroxyethyl)-p-toluidine, N,N,2,4,6-pentamethylaniline, N,N,2,4-tetramethylaniline, N,N-diethyl-2,4,6-trimethylaniline, and the like.

These tertiary amines may be used individually or in combination with two or more tertiary amines.

<Polymerization Inhibitor>

Examples of the polymerization inhibitor include dibutyl hydroxytoluene (2,6-di-tert-butyl-p-cresol), 6-tert-butyl-2,4-xylenol, and the like. These polymerization inhibitors may be used individually or in combination with two or more polymerization inhibitors.

<Filler>

Examples of the fillers include anhydrous silicic acid powder, fumed silica, alumina powder, and glass powder (e.g., barium glass powder, fluoroaluminosilicate glass powder), and the like. These fillers may be used individually or in combination of two or more fillers.

The filler may be treated with a surface treatment agent such as a silane coupling agent and the like.

<Polymerizable Composition>

The polymerizable composition of the present embodiment has a solution, that a second polymerizable monomer is dissolved in a first solvent, is dispersed in a first polymerizable monomer. Here, the first polymerizable monomer is a liquid, and the second polymerizable monomer is a solid.

The polymerizable composition of the present embodiment can be produced by the above-mentioned method for producing a polymerizable composition. As the first polymerizable monomer used in the polymerizable composition of the present embodiment, the first polymerizable monomer used in the method for producing the above-mentioned polymerizable composition can be used.

Further, as the second polymerizable monomer used in the polymerizable composition of the present embodiment, the second polymerizable monomer used in the method for producing the above-mentioned polymerizable composition can be used. Further, as the first solvent used in the polymerizable composition of the present embodiment, the first solvent used in the method for producing the above-mentioned polymerizable composition can be used.

The content of the first polymerizable monomer in the polymerizable composition of the present embodiment is preferably in the range of 1 to 99.9% by mass, more referable in the range of 1.5 to 79% by mass, and furthermore preferably in the range of 2 to 49% by mass. If the content of the first polymerizable monomer in the polymerizable composition of the resent embodiment is 1% by mass or more, the mechanical strength of the cured product of the polymerizable composition is improved. If the content of the first polymerizable monomer in the polymerizable composition is 99.9% by mass or less, the function or performance derived from the second polymerizable monomer of the cured product of the polymerizable composition is improved.

The content of the second polymerizable monomer in the polymerizable composition of the ° resent embodiment is not particularly limited. Examples of the content of the second polymerizable monomer is preferably in the range of 0.01 to 99% by mass, more preferably in the range of 0.02 to 79% by mass, and furthermore preferably in the range of 0.03 to 49% by mass. If the content of the second polymerizable monomer in the polymerizable composition is 0.01% by mass or more, the function or the performance derived from the second polymerizable monomer of the cured product of the polymerizable composition is improved. If the content of the second polymerizable monomer in the polymerizable composition is 99% by mass or less, the mechanical strength of the cured product of the polymerizable composition is improved.

The content of the first solvent in the polymerizable composition of the present embodiment is preferably in the range of 0.01 to 40% by mass, more preferably in the range of 0.02 to 35% by mass, and furthermore preferably in the range of 0.03 to 30% by mass. If the content of the first solvent in the polymerizable composition of the present embodiment is 0.01% by mass or more, the function or performance derived from the second polymerizable monomer of the cured product of the polymerizable composition is improved. If the content of the first solvent in the polymerizable composition is 40% by mass or less, the mechanical strength of the cured product of the polymerizable composition is improved.

In the polymerizable composition of the present embodiment, the second polymerizable monomer preferably has a functional group that exhibits at least one of antibacterial and antiviral properties. The second polymerizable monomer used in the above-mentioned method for producing the polymerizable composition can be used for the second polymerizable monomer having a functional group that exhibits at least one of antibacterial and antiviral properties. Specifically, a quaternary ammonium base or the like used in the above-mentioned method for producing the polymerizable composition can be used as a functional group exhibiting at least one of antibacterial and antiviral properties used in the second polymerizable monomer.

The use of the polymerizable composition of the present embodiment is not particularly limited. For example, the polymerizable composition of the present embodiment is used for products demanded for performance of antibacterial and antiviral properties. Among them, the polymerizable composition of the present embodiment is preferably used for a dental polymerizable composition in the field of dentistry.

Examples of the dental polymerizable compositions include dental composite resins, dental cement, denture bed resins, denture universal resins, and the like. Among these, dental composite resins are preferably used.

<Cured Product>

As the cured product prepared by curing the polymerizable composition of the present embodiment, the cured product prepared by curing the polymerizable composition prepared by the above-described method for producing the polymerizable composition of the present embodiment can be used. Further, as the cured product prepared by curing the polymerizable composition of the present embodiment, the cured product prepared by curing the above-mentioned polymerizable composition of the present embodiment can be used. The cured product prepared by curing the polymerizable composition is the cured product of the polymerizable composition prepared by polymerizing and curing the polymerizable composition.

Specifically, when the second polymerizable monomer in the polymerizable composition has a functional group that exhibits at least one of antibacterial and antiviral properties, the functions of antibacterial property and/or the antiviral property can be imparted to the cured product of the polymerizable composition.

The use of cured product of the polymerizable composition of the present embodiment is not particularly limited. For example, the cured product of the present embodiment is used for products demanded for performance of antibacterial and antiviral properties. Among them, the cured product prepared by curing the polymerizable composition is preferably used as the cured product prepared by curing the dental polymerizable composition in the field of dentistry. Furthermore, the cured product of the dental polymerizable composition can be applied to, for example, a dental resin block and the like.

EXAMPLE

Hereinafter, examples of the present invention will be described, but the present invention is not limited to examples.

First, in Examples of polymerizable compositions in the present embodiments, dental composite resins were prepared and evaluated.

Example 1-1

4 g of 2-(methacryloyloxy)ethyltrimethyl ammonium chloride (hereinafter referred to as MTMAC) as a second polymerizable monomer and 1 g of distilled water as a first solvent were added to a lidded bottle, and the mixture was then stirred with a stirrer to prepare an aqueous solution of MTMAC.

7 g of ethoxylated bisphenol A dimethacrylate (hereinafter referred to as BisMEPP) and 6 g of neopentylglycol dimethacrylate (hereinafter referred to as MPG) were mixed to prepare a first polymerizable monomer. 20 g of fluoroaluminosilicate glass powder which surface-treated with 3-glycidyloxytrimethoxysilane having a median diameter of 0.4 μm, 0.02 g of (±)-camphorquinone, 0.05 g of ethyl p-dimethylaminobenzoate, and 2 g of the aqueous solution of MTMAC were then mixed with the first polymerizable monomer. The mixture was kneaded to form a uniform paste in an agate mortar to prepare a dental composite resin.

Example 1-2

8 g of MTMAC as a second polymerizable monomer and 2 g of distilled water as a first solvent were added to a lidded bottle, and the mixture was then stirred with a stirrer to prepare an aqueous solution of MTMAC.

4.5 g of BisMEPP and 3.5 g of NPG were mixed to prepare a first polymerizable monomer. 20 g of fluoroaluminosilicate glass powder, which was surface-treated with 3-glycidyloxytrimethoxysilane, having a median diameter of 0.4 μm, 0.02 g of (±)-camphorquinone, 0.05 g of ethyl p-dimethylaminobenzoate, and 7 g of an aqueous solution of MTMAC were then added to the mixture. The mixture was kneaded to form a uniform paste in an agate mortar to prepare a dental composite resin.

Example 1-3

4 g of MTMAC as a second polymerizable monomer and 1 g of distilled water as a first solvent were added to a lidded bottle, and the mixture was then stirred with a stirrer to prepare an aqueous solution of MTMAC.

7.5 g of BisMEPP and 7 g of NPG were mixed to prepare a first polymerizable monomer. 20 g of fluoroaluminosilicate glass powder which surface-treated with 3-glycidyloxytrimethoxysilane having a median diameter of 0.4 μm, 0.02 g of (±)-camphorquinone, 0.05 g of ethyl p-dimethylaminobenzoate, and 0.5 g of an aqueous solution of MTMAC were then added to the mixture. The mixture was kneaded to form a uniform paste in an agate mortar to prepare a dental composite resin.

Example 1-4

4 g of MTMAC as a second polymerizable monomer was weighed in a weighing dish, and then allowed to stand for 3.5 hours at a temperature of 23° C. and 50% relative humidity. Moisture in the atmosphere was absorbed into the MTMAC to an aqueous solution of MTMAC. At this time, the mass of the weighing dish increased by 1 g.

A dental composite resin was prepared in the same manner as in Example 1-1, except that the aqueous solution of the resulting MTMAC was used.

Example 1-5

5 g of MTMAC as a second polymerizable monomer and 5 g of glycerin as a first solvent were added to a lidded bottle, and the mixture was then stirred with a stirrer to prepare a glycerin solution of MTMAC.

A dental composite resin was prepared in the same manner as in Example 1-1, except that the glycerin solution of MTMAC was used instead of the aqueous solution of MTMAC.

Example 1-6

5 g of MTMAC as a second polymerizable monomer and 5 g of propylene glycol as a first solvent were added to a lidded bottle, and the mixture was then stirred with a stirrer to prepare a propylene glycol solution of MTMAC.

7 g of BisMEPP and 6 g of MPG were mixed to prepare a first polymerizable monomer. 20 g of fluoroaluminosilicate glass powder, which was surface-treated with 3-glycidyloxytrimethoxysilane, having a median diameter of 0.4 μm, 0.02 g of (±)-camphorquinone, 0.05 g of ethyl p-dimethylaminobenzoate, 0.01 g of sodium dodecyl sulfate (hereinafter referred to as SDS) as a surfactant, and 2 g of propylene glycol solution of MTMAC were then added to the mixture. The mixture was kneaded to form a uniform paste in an agate mortar to prepare a dental composite resin.

Example 1-7

4 g of (3-acrylamide propyl) trimethylammonium chloride (hereinafter referred to as AATMAC) as a second polymerizable monomer and 1 g of distilled water as a first solvent were added to a lidded bottle, and the mixture was then stirred with a stirrer to prepare an aqueous solution of AATMAC.

A dental composite resin was prepared in the same manner as in Examples 1-1, except that the aqueous solution of AATMAC was used instead of the aqueous solution of MTMAC.

Example 1-8

4 g of (2-(acryloyloxy)ethyl)trimethylammonium chloride (hereinafter referred to as ATMAC) as a second polymerizable monomer and 1 g of distilled water as a first solvent were added to a lidded bottle, and the mixture was then stirred with a stirrer to prepare an aqueous solution of ATMAC.

A dental composite resin was prepared in the same manner as in Example 1-1, except that the aqueous solution of ATMAC was used instead of the aqueous solution of MTMAC.

Example 1-9

4 g of N-(2-acryloyloxyethyl)-N-benzyl-N,N-dimethylammonium chloride (hereinafter referred to as ABDMAC) as a second polymerizable monomer and 1 g of distilled water as a first solvent were added to a lidded bottle, and the mixture was then stirred with a stirrer to prepare an aqueous solution of ABDMAC.

A dental composite resin was prepared in the same manner as in Example 1-1, except that the aqueous solution of ABDMAC was used instead of the aqueous solution of MTMAC.

Example 2

A mixture of 7 g of BisMEPP and 6 g of NPG as a first polymerizable monomer, 1.6 g of MTMAC as a second polymerizable monomer, and 0.4 g of distilled water as a first solvent were mixed. 20 g of fluoroaluminosilicate glass powder surface-treated with 3-glycidyloxytrimethoxysilane having a median diameter of 0.4 μm, 0.02 g of (±)-camphorquinone, and 0.05 g of ethyl p-dimethylaminobenzoate were then added to the mixture. The mixture was kneaded to form a uniform paste in an agate mortar to prepare a dental composite resin.

Example 3

6 g of NPG as a first polymerizable monomer and 4 g of MTMAC as a second polymerizable monomer were added to 200 mL of ethanol as a second solvent, followed by stirring the mixture with a stirrer for 5 hours with heating to 50° C. in a water bath to prepare an ethanol solution of MTMAC/NPG. The ethanol was evaporated under reduced pressure from the ethanol solution of MTMAC/NPG using an evaporator to prepare an NPG dispersion liquid of MTMAC.

1 g of distilled water as a first solvent was added to 10 g of the NPG dispersion liquid of MTMAC, followed by stirring with a stirrer to prepare an emulsion in which the aqueous solution of MTMAC was dispersed in the NPG.

7 g of BisMEPP and 3 g of NPG were mixed to prepare as a first polymerizable monomer. 20 g of fluoroaluminosilicate glass powder which surface-treated with 3-glycidyloxytrimethoxysilane having a median diameter of 0.4 μm, 0.02 g of (±)-camphorquinone, 0.05 g of ethyl p-dimethylaminobenzoate, and 5 g of the emulsion were then added to the first polymerizable monomer. The mixture was kneaded to form a uniform paste in an agate mortar to prepare a dental composite resin.

Comparative Example 1

7 g of BisMEPP and 3 g of NPG were mixed to prepare as a first polymerizable monomer. 15 g of fluoroaluminosilicate glass powder which surface-treated with 3-glycidyloxytrimethoxysilane having a median diameter of 0.4 μm, 0.02 g of (±)-camphorquinone, and 0.05 g of ethyl p-dimethylaminobenzoate were mixed to the mixture. 2 g of MTMAC as a second polymerizable monomer and 3 g of NPG as a first polymerizable monomer were then mixed to the mixture. The mixture was kneaded to form a uniform paste in an agate mortar to prepare a dental composite resin.

The appearance, strength, antibacterial properties, and long-lasting antibacterial properties of the cured products of the dental composite resins (test specimens) were then evaluated.

<Appearance of Cured Product>

The surfaces of the cured products with 15 mm in diameter and 1 mm in height, prepared by photopolymerizing the dental composite resins using a dental light irradiator, were water-injection polished with water-resistant polishing paper #4000. The presence or absence of irregularities on the polished surfaces were then visually checked to evaluate the appearance of the cured products.

The criteria for determining the appearance of the cured products were as follows.

Excellent: No irregularities on the polished surface of the cured product and good appearance of the cured product were observed.

Poor: Irregularities on the polished surface of the cured product and poor appearance of the cured product were observed.

<Strength of Cured Product>

Strength of the cured products were evaluated in accordance with JIS T 6514:2015 Composite Resin Bending Test for Dental Restoration.

The criteria for the strength of the cured product were as follows.

Excellent: The bending strength of the cured product was 100 MPa or more.

Good: The bending strength of the cured product was 80 MPa or more and less than 100 MPa.

Poor: The bending strength of the cured product was less than 80 MPa.

<Antibacterial Properties>

The antibacterial properties of test specimens were evaluated in accordance with JIS Z 2801:2012 Antibacterial Processed Products-Antibacterial Test Methods and Antibacterial Effects.

*Streptococcus mutans* was used as test organism.

Furthermore, 1/10 BHI medium was used instead of 1/500 broth medium, assuming that the medium exhibited antibacterial activity even under harsher conditions when inoculating the test organism to the test specimens.

The criteria for the antibacterial properties of the test specimen were as follows.

Excellent: The antibacterial activity value on the test specimen was 4 or higher.

Good: The antibacterial activity value on the test specimen was 2 or higher and less than 4.

Poor: The antibacterial activity value on the test specimen was less than 2.

<Long-Lasting Antibacterial Properties>

The test specimens were immersed in neutral phosphate buffer for 1 month, and the antibacterial properties of the test specimens were then evaluated in the same manner as described above.

Table 1 indicates the evaluation results of the appearance, strength, antibacterial properties, and long-lasting antibacterial properties of the cured products of the dental composite resins.

TABLE 1

| | Example 1 | | | | | | |
|---|---|---|---|---|---|---|---|
| | 1 | 2 | 3 | 4 | 5 | 6 | 7 |
| First polymerizable monomer | BisMEPP NPG | BisMEPP NPG | BisMEPP NPG | BisMEPP NPG | BisMEPP NPG | BisMEPP NPG | BisMEPP NPG |
| Second polymerizable monomer | MTMAC | MTMAC | MTMAC | MTMAC | MTMAC | MTMAC | AATMAC |
| First solvent | Water | Water | Water | Water (moisture) | Glycerin | Propylene glycol | Water |
| Second solvent | — | — | — | — | — | — | — |
| Surfactant | — | — | — | — | — | SDS | — |
| Appearance of cured product | Excellent | Excellent | Excellent | Excellent | Excellent | Excellent | Excellent |
| Strength of cured product | Excellent | Excellent | Excellent | Excellent | Excellent | Excellent | Excellent |
| Antibacterial properties | Excellent | Excellent | Excellent | Excellent | Excellent | Excellent | Excellent |
| Long-lasting antibacterial properties | Excellent | Excellent | Excellent | Excellent | Excellent | Excellent | Excellent |

| | Example 1 | | Example 2 | Example 3 | Comparative Example 1 |
|---|---|---|---|---|---|
| | 8 | 9 | | | |
| First polymerizable monomer | BisMEPP NPG | BisMEPP NPG | BisMEPP NPG | BisMEPP NPG | BisMEPP NPG |
| Second polymerizable monomer | ATMAC | ABDMAC | MTMAC | MTMAC | MTMAC |
| First solvent | Water | Water | Water | Water | — |
| Second solvent | — | — | — | Ethanol | — |
| Surfactant | — | — | — | — | — |
| Appearance of cured product | Excellent | Excellent | Excellent | Excellent | Poor |
| Strength of cured product | Excellent | Excellent | Excellent | Excellent | Poor |
| Antibacterial properties | Excellent | Excellent | Excellent | Excellent | Excellent |
| Long-lasting antibacterial properties | Excellent | Excellent | Excellent | Excellent | Good |

From Table 1, the dental composite resins of Examples 1-1 to 1-9, Examples 2, and Example 3 exhibited excellent appearance, strength, antibacterial properties, and long-lasting antibacterial properties of the cured products.

In contrast, the dental composite resin of Comparative Example 1 exhibited poor appearance and strength of the cured product, because the dental composite resin in Comparative Example 1 was manufactured without using the first solvent.

In the Examples, the cured product prepared by curing the polymerizable composition of the present embodiment, a plastic piece was prepared as a test specimen and evaluated.

Example 4

4 g of 2-(methacryloyloxy)ethyltrimethyl ammonium chloride (hereinafter referred to as MTMAC) as a second polymerizable monomer and 1 g of distilled water as a first solvent were added to a lidded bottle, and the mixture was then stirred with a stirrer to prepare an aqueous solution of MTMAC.

14 g of ethoxylated bisphenol A dimethacrylate (hereinafter referred to as BisMEPP) and 12 g of neopentylglycol dimethacrylate (hereinafter referred to as NPG) were mixed to prepare a first polymerizable monomer. 0.04 g of (±)-camphorquinone, 0.1 g of ethyl p-dimethylaminobenzoate, and 4 g of the aqueous solution of MTMAC were then mixed with the first polymerizable monomer. The mixture was kneaded to form a uniform paste in an agate mortar to prepare a composite resin. The composite resin was irradiated with light for 5 minutes with an LED light having a wavelength of 365 to 465 nm and an irradiation intensity of 1200 mW/cm$^2$, and polymerized to prepare a plastic piece.

Example 5

16 g of MTMAC as a second polymerizable monomer and 4 g of distilled water as a first solvent were added to a lidded bottle, and the mixture was then stirred with a stirrer to prepare an aqueous solution of MTMAC.

18 g of BisMEPP and 14 g of NPG were mixed to prepare a first polymerizable monomer. 0.04 g of (±)-camphorquinone, 0.1 g of ethyl p-dimethylaminobenzoate, and 14 g of an aqueous solution of MTMAC were then added to the mixture. The mixture was kneaded to form a uniform paste in an agate mortar to prepare a composite resin. The composite resin was irradiated with light for 5 minutes with an LED light having a wavelength of 365 to 465 nm and an irradiation intensity of 1200 mW/cm$^2$, and polymerized to prepare a plastic piece.

Example 6

4 g of MTMAC as a second polymerizable monomer and 1 g of distilled water as a first solvent were added to a lidded bottle, and the mixture was then stirred with a stirrer to prepare an aqueous solution of MTMAC.

15 g of BisMEPP and 14 g of NPG were mixed to prepare a first polymerizable monomer. 0.04 g of (±)-camphorquinone, 0.1 g of ethyl p-dimethylaminobenzoate, and 1 g of an aqueous solution of MTMAC were then added to the mixture. The mixture was kneaded to form a uniform paste in an agate mortar to prepare a composite resin. The composite resin was irradiated with light for 5 minutes with an LED light having a wavelength of 365 to 465 nm and an irradiation intensity of 1200 mW/cm$^2$, and polymerized to prepare a plastic piece.

Example 7

4 g of MTMAC as a second polymerizable monomer was weighed in a weighing dish, and then allowed to stand for 3.5 hours at a temperature of 23° C. and 50% relative humidity. Moisture as a first solvent in the atmosphere was absorbed into the MTMAC to prepare an aqueous solution of MTMAC. At this time, the mass of the weighing dish increased by 1 g.

A plastic piece was prepared in the same manner as in Example 1, except that the aqueous solution of MTMAC was used.

Example 8

5 g of MTMAC as a second polymerizable monomer and 5 g of glycerin as a first solvent were added to a lidded bottle, and the mixture was then stirred with a stirrer to prepare a glycerin solution of MTMAC.

A plastic piece was prepared in the same manner as in Example 4, except that glycerin solution of MTMAC was used instead of using the aqueous solution of MTMAC.

Example 9

5 g of MTMAC as a second polymerizable monomer and 5 g of propylene glycol as a first solvent were added to a lidded bottle, and the mixture was then stirred with a stirrer to prepare a propylene glycol solution of MTMAC.

14 g of BisMEPP and 12 g of NPG were mixed to prepare a first polymerizable monomer. 0.04 g of (±)-camphorquinone, 0.1 g of ethyl p-dimethylaminobenzoate, 0.02 g of sodium dodecyl sulfate (hereinafter, referred to as SDS) as a surfactant, and 4 g of aqueous solution of MTMAC were then added to the mixture. The mixture was kneaded to form a uniform paste in an agate mortar to prepare a composite resin. The composite resin was irradiated with light for 5 minutes with an LED light having a wavelength of 365 to 465 nm and an irradiation intensity of 1200 mW/cm$^2$, and polymerized to prepare a plastic piece.

Example 10

4 g of (3-acrylamide propyl) trimethylammonium chloride (hereinafter referred to as AATMAC) as a second polymerizable monomer and 1 g of distilled water as a first solvent were added to a lidded bottle, and the mixture was then stirred with a stirrer to prepare an aqueous solution of AATMAC.

A plastic piece was prepared in the same manner as in Example 4, except that the aqueous solution of AATMAC was used instead of using the aqueous solution of MTMAC.

Example 11

4 g of (2-(acryloyloxy)ethyl)trimethylammonium chloride (hereinafter referred to as ATMAC) as a second polymerizable monomer and 1 g of distilled water as a first solvent were added to a lidded bottle, and the mixture was then stirred with—a stirrer to prepare an aqueous solution of ATMAC.

A plastic piece was prepared in the same manner as in Example 4, except that the aqueous solution of ATMAC was used instead of using the aqueous solution of MTMAC.

Example 12

4 g of N-(2-Acryloyloxyethyl)-N-benzyl-N,N-dimethylammonium chloride (hereinafter referred to as ABDMAC)

as a second polymerizable monomer and 1 g of distilled water as a first solvent were added to a lidded bottle, and the mixture was then stirred with a stirrer to prepare an aqueous solution of ABDMAC.

A plastic piece was prepared in the same manner as in Example 4, except that the aqueous solution of ABDMAC was used instead of using the aqueous solution of MTMAC.

14 g of BisMEPP and 6 g of NPG were mixed to prepare a first polymerizable monomer. 0.04 g of (±)-camphorquinone and 0.1 g of ethyl p-dimethylaminobenzoate were mixed to the mixture. 4 g of aqueous solution of MTMAC as a second polymerizable monomer and 6 g of NPG a first polymerizable monomer were then added to the mixture. The mixture was kneaded to form a uniform paste in an agate mortar to prepare a composite resin. The composite resin was irradiated with light for 5 minutes with an LED light having a wavelength of 365 to 465 nm and an irradiation intensity of 1200 mW/cm$^2$, and polymerized to prepare a plastic piece.

<Antiviral Properties>

The antiviral properties of the test specimens were evaluated using Porcine epidemic diarrhea virus, which is an envelope virus, as a test virus in accordance with ISO 21702 antiviral properties (non-textile product).

The criteria for the antiviral properties of the test specimens were as follows.

Excellent: The antiviral activity value of the test specimen was 2 or more.

Poor: The antiviral activity value of the test specimen was less than 2.

<Long-Lasting Antiviral Properties>

After immersing the test specimens in a neutral phosphate buffer solution for 1 month, the antiviral properties of the test specimens were evaluated in the same manner as above.

Table 2 indicates the evaluation results of the appearance, antiviral properties, and long-lasting antiviral properties of the plastic pieces.

TABLE 2

|  | Example | | | | | | | | | Comparative |
|---|---|---|---|---|---|---|---|---|---|---|
|  | 4 | 5 | 6 | 7 | 8 | 9 | 10 | 11 | 12 | Example 2 |
| First polymerizable monomer | BisMEPP NPG | BisMEPP NPG | BisMEPP NPG | BisMEPP NPG | BisMEPP NPG | BisMEPP NPG | BisMEPP NPG | BisMEPP NPG | BisMEPP NPG | BisMEPP NPG |
| Second polymerizable monomer | MTMAC | MTMAC | MTMAC | MTMAC | MTMAC | MTMAC | AATMAC | AATMAC | ABDMAC | MTMAC |
| First solvent | Water | Water | Water | Water (moisture) | Glycerin | Propylene glycol | Water | Water | Water | — |
| Second solvent | — | — | — | — | — | — | — | — | — | — |
| Surfactant | — | — | — | — | — | SDS | — | — | — | — |
| Appearance of plastic piece | Excellent | Excellent | Excellent | Excellent | Excellent | Excellent | Excellent | Excellent | Excellent | Poor |
| Antiviral properties | Excellent | Excellent | Excellent | Excellent | Excellent | Excellent | Excellent | Excellent | Excellent | Excellent |
| Long-lasting antiviral properties | Excellent | Excellent | Excellent | Excellent | Excellent | Excellent | Excellent | Excellent | Excellent | Poor |

Next, the appearance, antiviral properties, and long-lasting antiviral properties of the plastic piece (test specimens) were evaluated.

<Appearance of Plastic Piece>

The appearance of the plastic piece was evaluated by visually confirming the presence or absence of irregularities on the surface of the plastic piece having a diameter of 15 mm and a thickness of 1 mm obtained by photopolymerization.

Figure 3:
FIG. 3 is an optical micrograph before curing of the polymerizable composition according to an embodiment.
Figure 4:
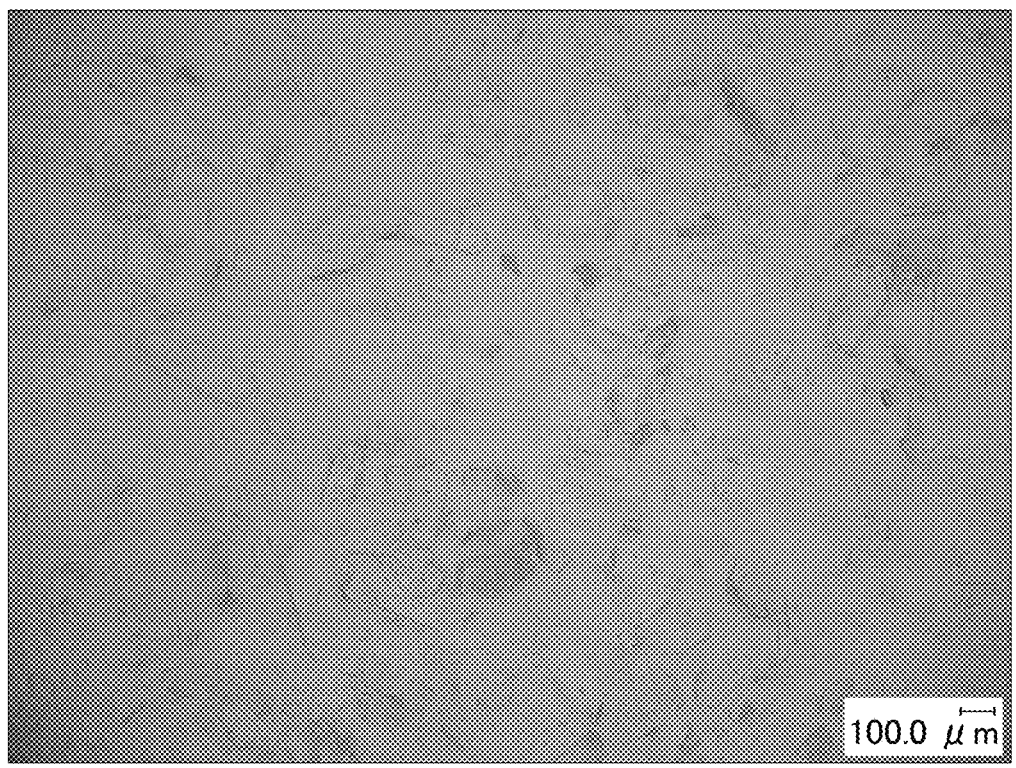
FIG. 4 is an optical micrograph before curing of the polymerizable composition according to the comparative example.
Figure 5:
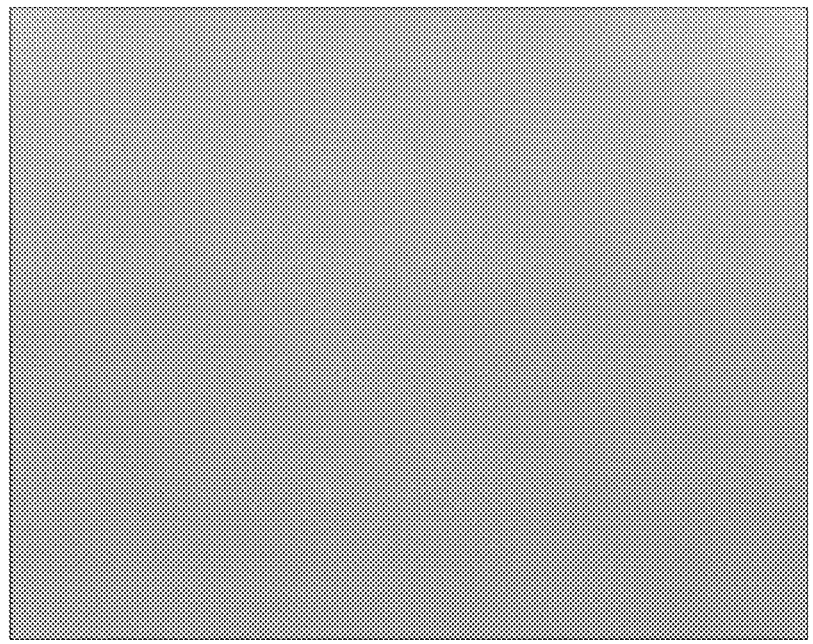
FIG. 5 is a photograph illustrating an appearance of a cured product of the polymerizable composition according to an embodiment.
Figure 6:
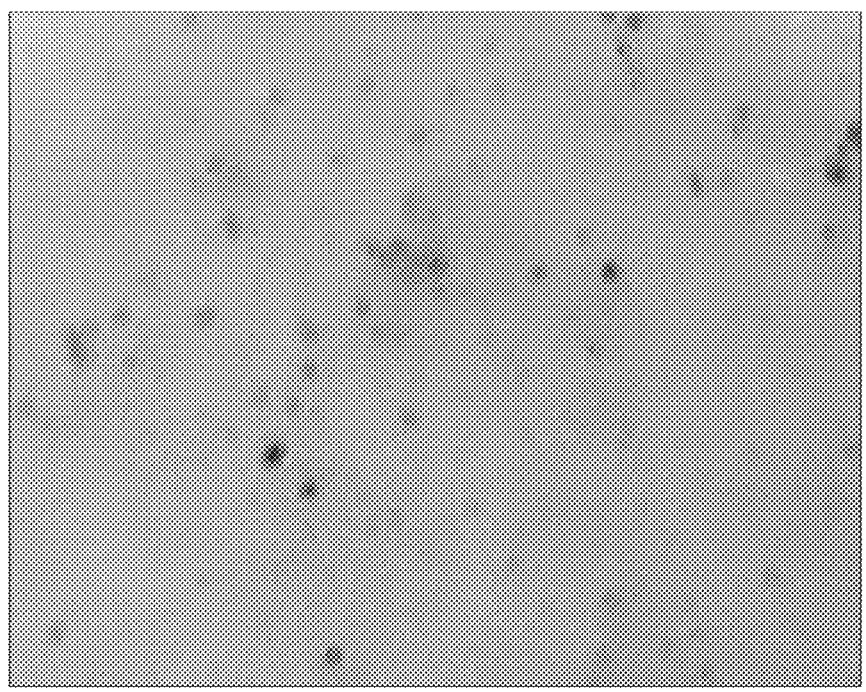
FIG. 6 is a photograph illustrating an appearance of a cured product of the polymerizable composition according to the comparative example.

FIG. 3 illustrates an optical micrograph of the state before curing the plastic piece of Example 4 as the cured product at a magnification of 100 times. FIG. 4 illustrates an optical micrograph of the state before curing the plastic piece of Comparative Example 2 as a cured product at a magnification of 100 times. Further, FIG. 5 illustrates the appearance of the plastic piece of Example 4 (after curing), and FIG. 6 illustrates the appearance of the plastic piece of Comparative Example 2 (after curing).

The criteria for the appearance of the plastic piece were as follows.

Excellent: No irregularities on the surface of the plastic piece and good appearance on the plastic piece were observed.

Poor: Irregularities on the surface of the plastic piece and bad appearance on the plastic piece were observed.

From Table 2, it can be seen that the plastic pieces of Examples 4 to 12 are excellent in appearance and have high antibacterial properties and long-lasting antibacterial properties. For example, according to the polymerizable composition 20 before curing provided on a coating material 10 in Example 4, it is assumed that a second polymerizable monomer 40 is uniformly distributed in a first polymerizable monomer 30 (The precipitate of the second polymerizable monomer is fine) (See FIG. 1).

Figure 2:
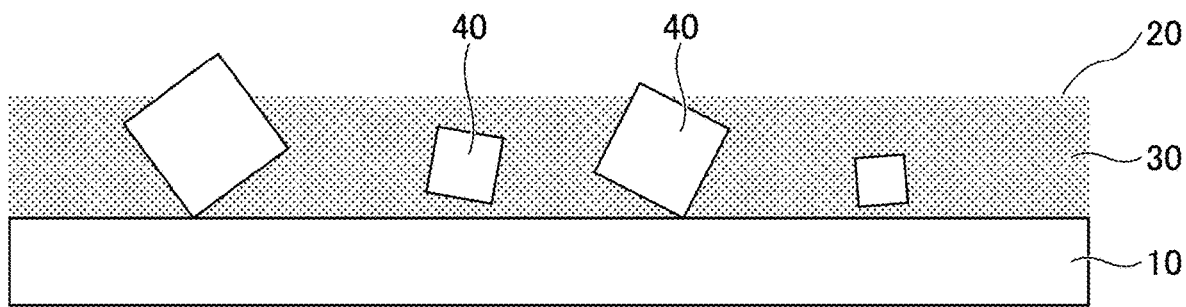
FIG. 2 is a schematic view illustrating a cross-section of a polymerizable composition according to a comparative example.

In contrast, the plastic piece of Comparative Example 2 is poor in appearance and has low long-lasting antibacterial properties because the plastic piece of Comparative Example 2 was obtained by curing the polymerizable composition without using the first solvent. For example, according to the polymerizable composition 20 before curing provided on the coating material 10 in Comparative Example 2, it is assumed that the second polymerizable monomer 40 is not uniformly distributed in the first polymerizable monomer 30 (The precipitate of the second polymerizable monomer is coarse) (See FIG. 2).

Further, the present invention is not limited to the described embodiments, but various variations and modifications may be made without departing from the scope of the present invention.

What is claimed is:

1. A method of manufacturing a polymerizable composition comprising:

dissolving a second polymerizable monomer that is solid in a first solvent to form a first solution, and mixing a first polymerizable monomer with the first solution, the first polymerizable monomer being a liquid, wherein the first solution is dispersed in the first polymerizable monomer, wherein the second polymerizable monomer includes antibacterial properties and antiviral properties, and wherein the polymerizable composition has at least one of the antibacterial properties and the antiviral properties.

2. The method of manufacturing a polymerizable composition according to claim 1, the method further comprising, adding a surfactant at a time of mixing the first polymerizable monomer, the second polymerizable monomer, and the first solvent.

3. The method of manufacturing a polymerizable composition according to claim 1, wherein the method is free of adding a surfactant at a time of mixing the first polymerizable monomer, the second polymerizable monomer, and the first solvent.

4. The method of manufacturing a polymerizable composition according to claim 1, the method comprising:

preparing a second solution by dissolving the second polymerizable monomer in a second solvent with at least a portion of the first polymerizable monomer, evaporating the second solvent from the second solution to prepare a dispersion liquid that is the portion of the first polymerizable monomer and the second polymerizable monomer dispersed therein; and mixing the dispersion liquid with the first solvent.

5. A method of manufacturing a polymerizable composition wherein a solution in which a second polymerizable monomer dissolved in a first solvent is dispersed in a first polymerizable monomer, the method comprising:

mixing the first polymerizable monomer being a liquid, the second polymerizable monomer being a solid, and the first solvent;

preparing a second solution by dissolving the second polymerizable monomer in a second solvent with at least a portion of the first polymerizable monomer;

evaporating the second solvent from the second solution to prepare a dispersion liquid that is the portion of the first polymerizable monomer and the second polymerizable monomer dispersed therein; and mixing the dispersion liquid with the first solvent.

* * * * *